United States Patent [19]
Maurice et al.

[11] Patent Number: 5,493,553
[45] Date of Patent: Feb. 20, 1996

[54] METHOD AND APPARATUS FOR PREVENTING CROSS-TALK DURING REPRODUCTION OF DATA RECORDED ON A HIGH DENSITY RECORDING MEDIUM

[75] Inventors: François Maurice, Verrieres le Buisson; Michel Sonrier, Bois D'Arcy; Charaf Hanna, Strasbourg; Joseph Colineau, Bures S/Yvette, all of France

[73] Assignees: Thomson CSF, Paris; Thomson Consumer Electronics, Courbevoie, both of France

[21] Appl. No.: 284,653
[22] PCT Filed: Dec. 21, 1993
[86] PCT No.: PCT/FR93/01279
§ 371 Date: Aug. 17, 1994
§ 102(e) Date: Aug. 17, 1994
[87] PCT Pub. No.: WO94/15335
PCT Pub. Date: Jul. 7, 1994

[30] Foreign Application Priority Data

Dec. 22, 1992 [FR] France .................................. 92 15474

[51] Int. Cl.[6] ........................................................ G11B 7/00
[52] U.S. Cl. .................. 369/109; 369/44.41; 369/44.37; 360/63
[58] Field of Search .............................. 369/48, 109, 124, 369/44.37, 44.38, 44.39, 44.41, 49, 275.1; 360/27, 63, 113, 115

[56] References Cited

U.S. PATENT DOCUMENTS

| 4,980,877 | 12/1990 | Sugiyama et al. | 369/44.41 |
| 5,057,945 | 10/1991 | Shimada et al. | 360/63 |
| 5,181,161 | 1/1993 | Hirose et al. | 369/109 |
| 5,282,104 | 1/1994 | Coutellier et al. | 360/119 |
| 5,335,120 | 8/1994 | Colineau et al. | 360/63 |

FOREIGN PATENT DOCUMENTS

61-287056  12/1986  Japan .
1478339  6/1977  United Kingdom .

*Primary Examiner*—Georgia Y. Epps
*Assistant Examiner*—Tan Dinh
*Attorney, Agent, or Firm*—Oblon, Spivak, McClelland, Maier & Neustadt

[57] ABSTRACT

A method and system for preventing cross-talk during reproduction of data recorded on a high density recording medium. The method includes the steps of receiving signals from at least three consecutively parallel information tracks on a recording medium, determining first and second cross-talk coefficients representing a degree of cross-talk between the three parallel information tracks, filtering the first and second cross-talk coefficients, correcting the cross-talk between the first, second, and third information tracks in accordance with the first and second cross-talk coefficients, forming a difference between the first and second cross-talk coefficients and integrating this difference to generate a track following correction signal, and repeating the above steps for each of the information tracks on the recording medium.

13 Claims, 6 Drawing Sheets

METHOD AND APPARATUS FOR PREVENTING CROSS-TALK DURING REPRODUCTION OF DATA RECORDED ON A HIGH DENSITY RECORDING MEDIUM

BACKGROUND OF THE INVENTION

1. Field of the Invention

The invention relates to a method of reading a recording medium and to a system applying this method.

The invention can be applied notably to the reading of magnetic or optical recordings and, in this context, to the reading of high-density recording. It can be applied preferably in recording systems such as computer peripherals or any professional systems.

It can be extended to recordings on optical tape and on magnetic or optical disks when it is sought to read several adjacent tracks therein in parallel.

2. Description of the Related Art

High-density recording on parallel tracks raises a twofold problem in re-reading: track following and track separation. The small width of the tracks (which is smaller than 20 μm) means that it is difficult, on a tape reader, to ensure the precision of the track-following operation on the basis solely of the mechanical guidance of the edge of the tape.

The need to ensure the inter-operational quality of the tapes and readers aggravates this difficulty.

Furthermore, to obtain a good signal-to-noise ratio in reading, it is necessary to re-read the entire track width. This rules out the existence of a barrier between tracks and induces phenomena of cross-talk in reading from track to track.

The present systems of high-density recording on tape are based on the use of an analyzer rotating drum. They require the implementation of track-following and cross-talk reduction techniques as explained here below.

The reading heads are generally wider than the tracks that they read and their gap has an azimuth angle (6-10-20) with respect to the normal in the direction of run. This azimuth is inverted from one head to another and, hence, from one track to the adjacent track so that, at reading, the cross-talk due to the neighboring tracks is attenuated all the more so as the frequencies are high. The cross-talk therefore is exerted only on the low part of the spectrum.

In analog video systems, there are color difference signals of low spatial resolution and it is seen to it that the cross-talk affects (mixes) only the identical colors of neighboring lines.

When the information element recorded is digital, steps are taken to increase the azimuth angle. For example, 10° for the 8 mm PCM system and 20° for the digital recording audio system (DAT). The system uses a channel code with little energy in the low frequencies (for example code 8–10 of the DAT).

The particular kinetics of rotating head systems having tracks that are inclined with respect to the edge of the tape has the consequence wherein the track-following operation can be done by making the rotational phase of the drum vary, the tape speed being constant. However, it is necessary to have an error signal available on the basis of information elements written on the tape.

Analog systems

In VHS systems, a marking track using a fixed head is used to servo-control the rotation of the drum. This system is fairly coarse and the interoperational quality is poor (a manual adjustment is needed).

In V2000 or 8 mm video systems, frequency pilot signals are recorded simultaneously with the video signal. Those tracks that sandwich the track being read are picked up by residual cross-talk. A lack of equilibrium between the right-hand and left-hand pilot signals results in an error voltage modifying the rotational phase of the drum.

Digital systems (DAT)

The same system is used, but the pilot signals cannot coexist with the digital modulation which they would disturb excessively (energy at the low frequencies). They are therefore time-division multiplexed with this digital modulation, taking up about 8% of the capacity of the channel.

In rotating-head systems, the azimuth recording makes it possible to do away with high frequency cross-talk while at the same time permitting the reading of low frequencies written on neighboring tracks in order to enable the track-following operation.

This technique cannot be transposed to fixed-head (non-rotating) systems because the constitution of these heads does not permit recording with azimuth.

The French patent application No. 88 05592 describes an exemplary magnetic recording fixed head.

The French patent application No. 89 17313 describes an exemplary head, also fixed, for the reading of magnetic recordings (by magneto-optical method).

SUMMARY OF THE INVENTION

The present invention relates to a method and a system for the reading of a recording such as a magnetic recording recorded on magnetic tape in the form of adjoining or quasi-adjoining tracks. It enables the computation of the cross-talk among several tracks and the correction of this cross-talk.

The invention can be applied in the context of a system wherein:

Several tracks are written contiguously on a medium without azimuth using, for example, a matrix type magnetic writing head (for example).

They are all read simultaneously, for example by means of a magneto-optical system using a linear CCD.

In the context of cross-talk correction, the system of the invention is such that:

The cross-talk resulting from the first neighboring tracks of each track are computed in real time.

The cross-talk is corrected in taking account of the previous computed coefficients, and of the values, which are known, of the disturbance-causing neighbors.

Any difference between the right-hand and left-hand cross-talk coefficients expresses a track-following error. This indication is used as an error value in an electromagnetic loop providing for the track-following operation.

This method therefore enables the cancellation of the cross-talk coming from the first neighbor and provides for the track-following operation modulo one track.

The invention therefore relates to a method for reading a recording medium comprising several tracks of information elements recorded in parallel, each information element being possibly an element with a positive value or a negative value, characterized in that said method comprises the following steps:

the reception of at least signals from a first track (xj) as well as a second track (xj−1) and a third track (xj+1) located on either side of the first track;

the computation of a first cross-talk coefficient (jg) by the multiplication of the value of a signal of the first track by the sign of the signal of the second track;

the computation of a second cross-talk coefficient (Cjd) by the multiplication of the value of the signal of the first track by the sign of the signal of the third track;

the filtering of the first coefficient and of the second coefficient of cross-talk.

The invention also relates to a system for the reading of a recording medium comprising several tracks of parallel-recorded information elements, each information element possibly having a positive or a negative value, characterized in that said system comprises:

a cross-talk estimation circuit receiving at least one first signal (xj) coming directly or not directly from a first track (j), at least one second signal (xj−1) coming directly or not directly from a second track (j−1) located on one side of the first track (j), at least one third signal (xj+1) coming directly or not directly from a third track (j+1) located on the other side of the first track with respect to the second track, and computing a first cross-talk coefficient (Cjg) in taking the product of the first signal by the sign of the second signal and a second cross-talk coefficient by taking the product of the first signal by the sign of the third signal;

a cross-talk correction circuit (5) directly receiving the first signal, the second signal and the third signal and computing a cross-talk corrected signal by subtracting, from the first signal, the product of the first cross-talk coefficient by the second signal as well as the product of the second cross-talk coefficient by the third signal.

BRIEF DESCRIPTION OF THE DRAWINGS

The different objects and features of the invention shall appear more clearly from the following description and from the appended figures, of which.

DETAILED DESCRIPTION OF THE PREFERRED EMBODIMENTS

Figure 1:
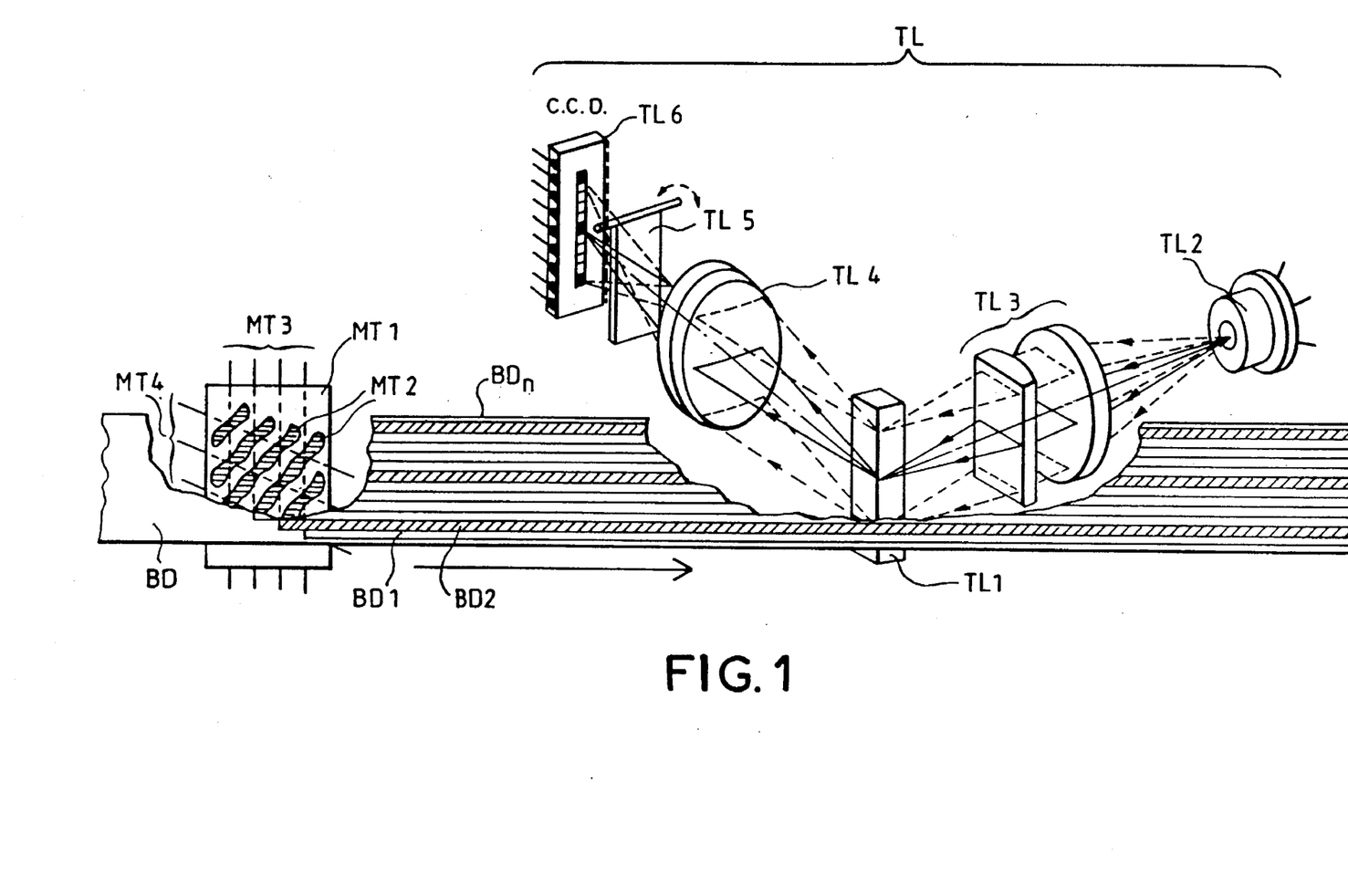
FIG. 1 shows a system for the recording and reading of magnetic tapes, in which the recording is done with a matrix head and the reading with a magneto-optical system.

Referring to FIG. 1, a description shall first be given of a recording-reading system in which the invention can be applied.

This system has a recording medium such as a magnetic tape BD. A matrix type recording head MT1 has a matrix of elementary heads MT2 controlled by row selection conductors MT3 and data selection conductors MT4. This head enables the recording, on the tape BD, of different tracks of information elements BD1, BD2, ... BDn, each corresponding to an elementary head of the matrix head MT1. This recording head is, for example, of the type described in the French patent application No. 88 05592.

The right-hand part of the figure shows a magneto-optical reading head TL such as that of the French patent application No. 89 17313.

This head TL has a magneto-optical transducer TL1 (based on the Kerr effect for example) positioned in parallel to the plane of the magnetic tape and having its length transversal to the length of the tape. A light source TL2 illuminates the transducer TL1 by a beam of polarized light, through a focusing system TL3, in such a way that the light beam is focused substantially along a line on one face of the transducer TL1 in the vicinity of the magnetic tape BD. The beam reflected by the transducer TL1 has its polarization modified as a function of the magnetic field on the tape. The reflected beam is transmitted by a focusing system TL4 and a track-following system TL5 to an optoelectronic detector TL6 having, for example, a charge-transfer device CCD.

The detector TL6 has at least as many detector elements as there are tracks on the tape.

The transducer TL1 reflects the beam towards the detector TL6. This beam is constituted, in reality, by a set of track reading beams, each having had its polarization influenced by a track of the magnetic tape. The set of these reading beams is received by the detector TL6 which thus enables the detection of the information elements read on each track of the tape BD.

The magneto-optical transducer is not etched and offers a continuous reading structure, which may contribute to the reading cross-talk. It remains fixed, and it is the track-following system TL5 that makes it possible, by deflecting the beam, to provide for the dynamic track following.

It is also possible to envisage a direct mechanical shifting of the CCD along its axis.

The optical system may be designed so that each track that is read is analyzed by only one photodiode.

It must be noted that it is advantageous not to shift the mechanical elements in contact with the tape (the transducer).

Figure 2:
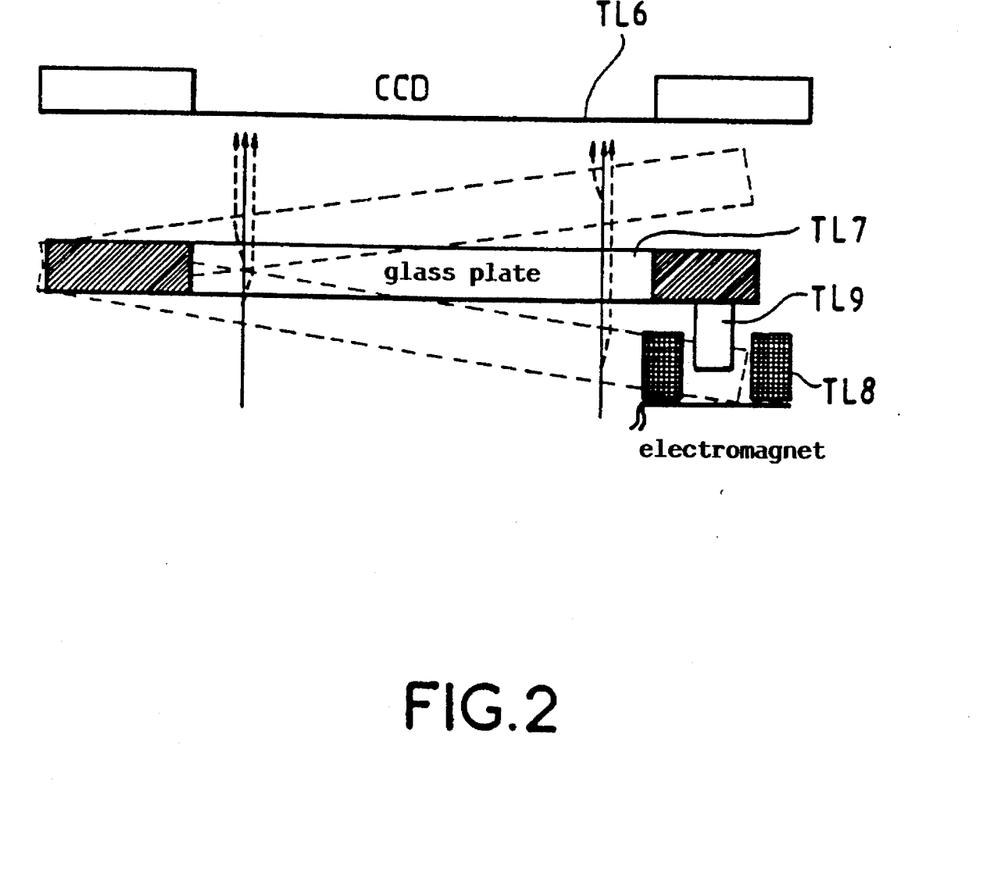
FIG. 2 shows a track-following system.

The track-following system TL5 may be made as shown in FIG. 2. It has a glass plate TL7 with a parallel faces positioned substantially parallel to the detector TL6 and rotating about an axis perpendicular to the greatest length of the transducer TL1. The rotation is controlled by an electromagnet TL8 and a solenoid plunger TL9 fixedly joined to the plate TL7. The electromagnet receives track-following electrical information elements and enables the plate to be oriented in such a way as to appropriately deflect the beam coming from the transducer TL1 towards the detector TL6 and in such a way as to assign each photodiode of the detector TL6 a track-reading beam transmitted by the transducer TL1.

The control of the plate TL7 can also be done by any device such as a piezoelectric device.

The track-following operation can also be carried out by shifting the detector TL6, the optical system TL4 and the transducer TL1 with respect to one another.

Figure 3A:
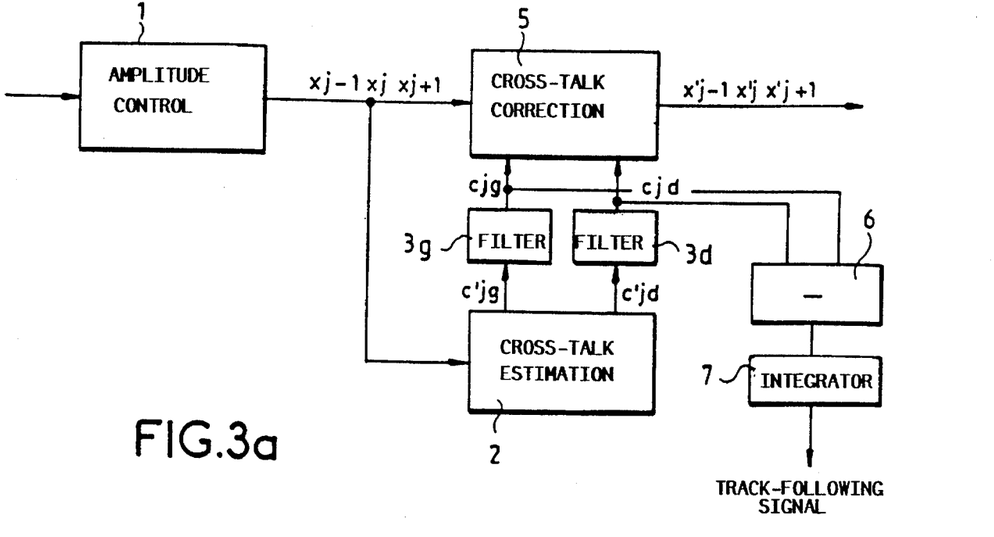
FIGS. 3a to 3e show an exemplary embodiment of the system of the invention.

Referring to FIG. 3a, a description shall now be given of a simplified cross-talk correction system according to the invention. According to the reading system of FIG. 1, the read head can be used to obtain simultaneous knowledge of the samples of all the tracks (unlike in the case of rotating-head systems where the precision of a passage from one head to the next head is insufficient). According to this simplified example, it will be assumed that the information samples coming from adjacent tracks are processed simultaneously.

The information elements coming from the j−1, j and j+1 order tracks shall be considered in order to obtain knowledge of the cross-talk undergone by the tracks j owing to the tracks j−1 and j+1.

The different information elements read in the tracks of the recording medium are received by an amplitude control circuit 1 whose role shall be indicated later. The different signals xj−1, xj, xj+1 are transmitted to the cross-talk estimation circuit 2 and a cross-talk correction circuit 5.

The cross-talk estimation circuit 2 estimates the cross-talk that may exist from the track j−1 to the track j and from the track j+1 to the track j. The estimation of a cross-talk coefficient C'jg (cross-talk of the track j−1 on the track j) is done by taking the product of the value of the signal xj by unity assigned the sign of the signal xj−1. More simply, hereinafter, we shall refer to the product of the value of the signal xj by the sign of the signal xj−1. Similarly, the estimation of the cross-talk coefficient C'jd (cross-talk of j+1 on j) is done by multiplying the value of the signal xj by the sign of the signal xj+1.

Figure 3B:
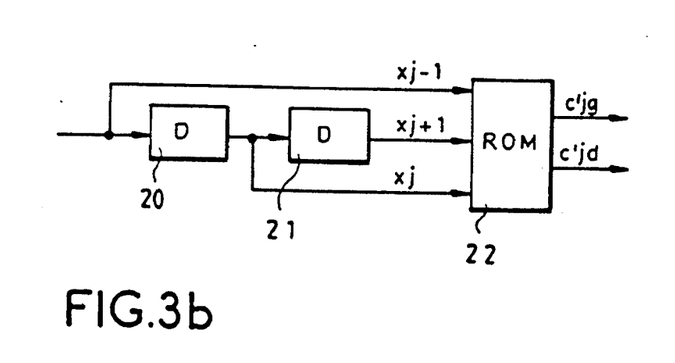

FIG. 3b shows an example of a cross-talk estimation circuit wherein the signals xj−1, xj, xj+1 arrive in series. Delay circuits 20, 21 reset the phase of these signals and a circuit 22, for example of the ROM memory type, computes the cross-talk coefficients C'jg and C'jd.

Each cross-talk coefficient C'jg and C'jd thus computed is transmitted to a filter 3g, 3d or "smoothing filter" enables the computation of the mean Cjg or Cjd in the course of time. For this purpose, each coefficient is combined with the previous cross-talk coefficient previously computed for the same track.

Figure 3C:
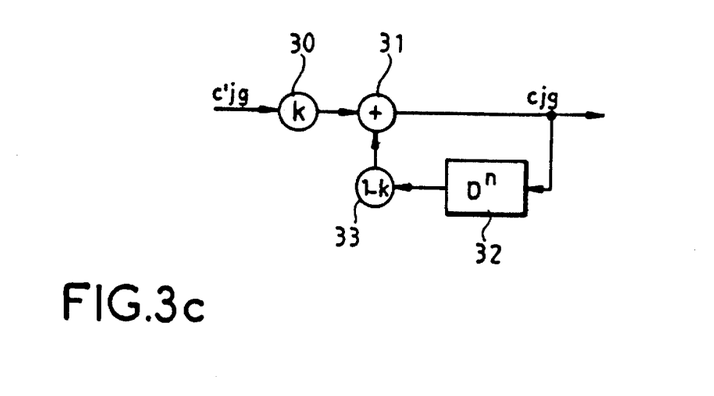

FIG. 3c exemplifies a smoothing filter. This filter is explained, for example, with respect to the cross-talk coefficient C'jg. A multiplier circuit 30 multiples the coefficient C'jg received by a weighting coefficient k, this coefficient k being smaller than 1. The result is sent to an adder 31 which receives, at a second input, the cross-talk coefficient previously computed for the same track, which had been kept in the memory 32 and is multiplied by the coefficient 1−k (multiplier circuit 33). Thus, at output, there is obtained a cross-talk coefficient Cjg that is filtered.

Figure 3D:
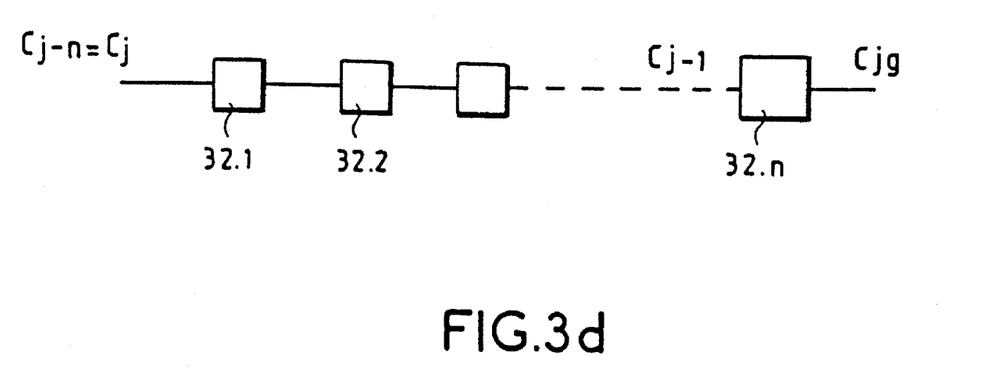

FIG. 3d shows the constitution, by way of an example, of the memory circuit 32. This memory circuit has n memory circuits 32.1 to 32.n. The number n is the number of tracks of the recording medium. Thus, whenever a track is processed, the previously computed cross-talk coefficients for the other tracks are shifted by one memory step in such a way that the coefficient Cjg of a track computed at a given instant enters the memory (right-hand side) and is presented to the circuits 33 and 31, n memory steps later, when the circuit 31 receives the next coefficient C'jg of the same track.

The cross-talk coefficients Cjg and Cjd thus filtered are transmitted to the cross-talk correction circuit 5. This circuit 5 also receives the signals xj−1, xj and xj+1 and corrects the cross-talk at the signal xj by carrying out the following operation:

$$xj-(Cjg.xj-1+Cjd.xj+1)$$

Figure 3E:
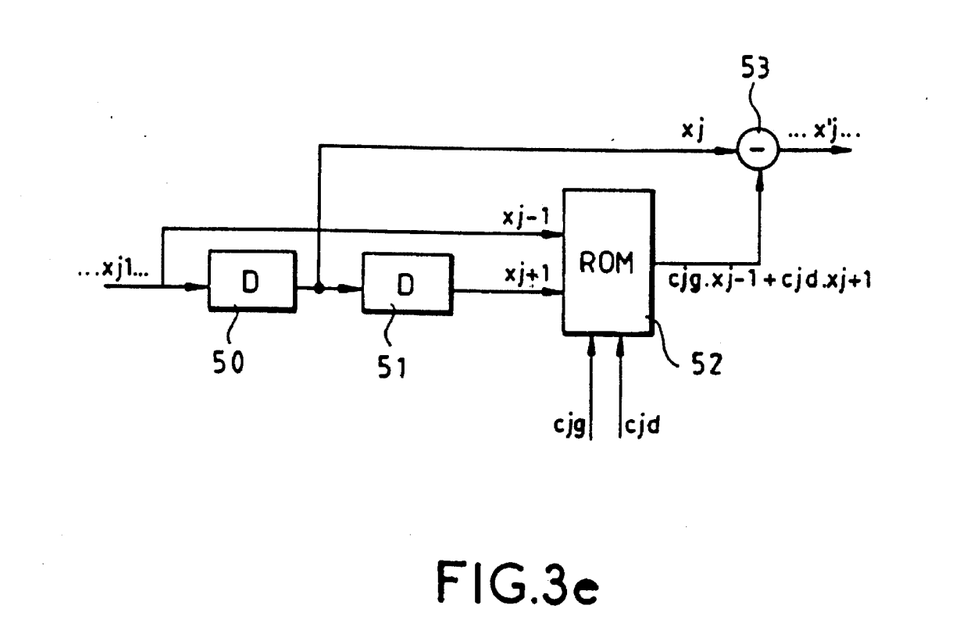

FIG. 3e shows an exemplary embodiment of the cross-talk correction circuit 5. This circuit has two delay circuits 50, 51 that can be used to rephase the signals xj−1, xj, xj+1 which are supposed to be received in series. A ROM type circuit 52 receives the cross-talk coefficients Cjg and Cjd as well as the signals xj−1 and xj+1 and gives an exchange Cjg.xj−1+ Cjd.xj+1. This result is transmitted to the subtraction circuit 53 which takes the difference between this result and the value of the signal xj. Thus, the cross-talk corrected signal x'j is obtained.

The circuit of FIG. 3a thus enables the correction of the cross-talk of the signals xj.

This circuit can also be used to compute a track-following signal to control the track-following device TL5 described here above or the respective positions of the detector TL6, the optical system TL4 and the transducer TL1. This is done by means of a subtraction circuit 6 that is connected to the outputs of the filters 3g and 3d and that takes the difference between the cross-talk coefficients. To prevent any sudden variation in the cross-talk coefficients from having an immediate effect on the track-following device, the difference Cjg−Cjd is integrated on the n tracks possessed by the recording medium. There is obtained a track following-signal for which the average can be taken on all the tracks to give a result that is insensitive to the phenomena affecting a particular track.

The different signals (xj) allowed into the circuit of FIG. 3a have, in principle, a value of −1 or +1. This is not so in reality. Thus, any notable difference may distort the operation of the circuit. This is why the amplitude control circuit mentioned here above can be used to reduce the different signals (xj) to a value that is comparable in terms of absolute value for all the tracks.

Figure 4A:
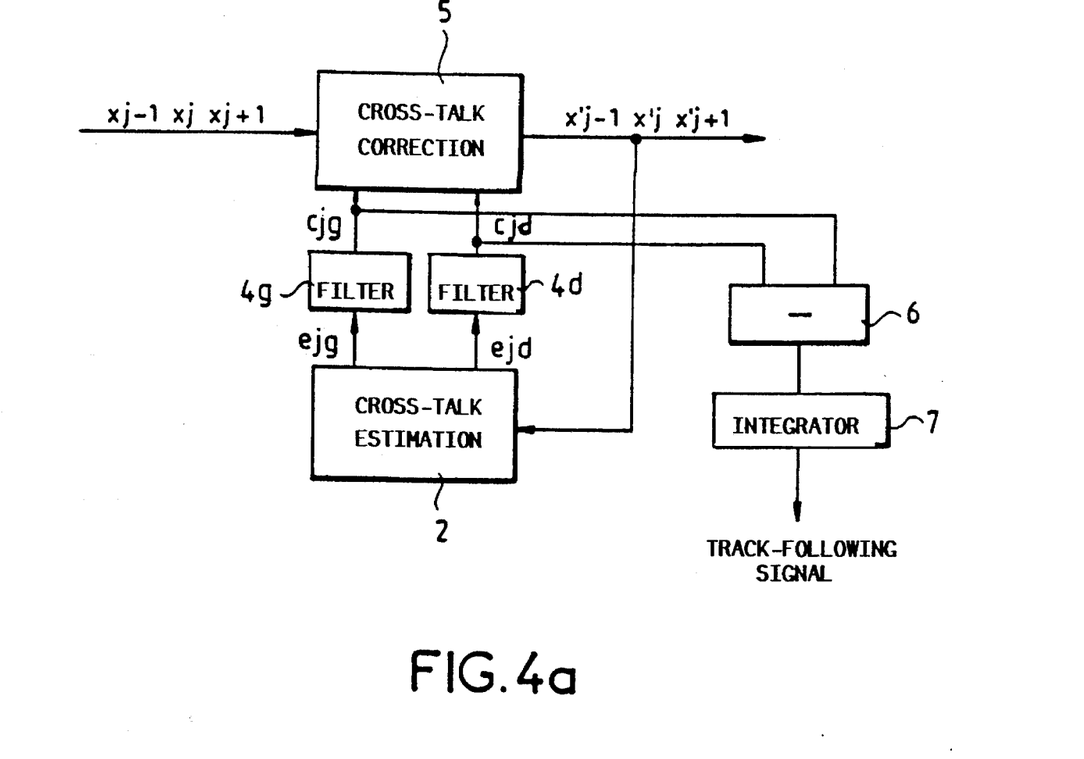
FIGS. 4a, 4b show an alternative embodiment of the system of the invention.
Figure 4B:
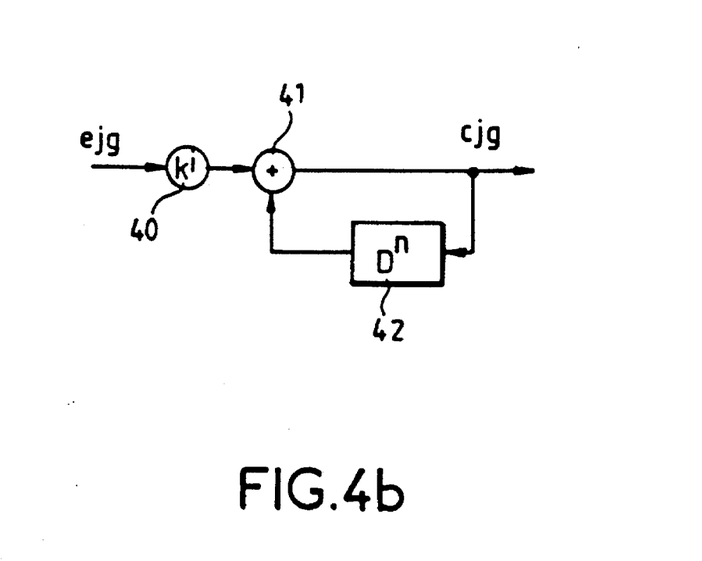

FIGS. 4a, 4b represent a preferred alternative embodiment according to the invention.

The circuit of FIG. 4a has a cross-talk correction circuit 5 that receives the signals x−j, xj, xj+1.

The cross-talk estimation circuit 2 is connected to the output of the cross-talk correction circuit 5. It is associated with an integrating filter and therefore carries out an a posteriori computation of the cross-talk coefficients. In fact, since the cross-talk computation is done at output of the cross-talk correction circuit 5, the cross-talk estimation circuit performs an estimation of the residual cross-talk of a signal that is assumed to be already corrected for cross-talk. This circuit 2 works in the same way as that of FIG. 3a.

The estimated residual cross-talk coefficients ejg and ejd are transmitted to integrating filters 4g and 4d. These filters continually integrate the cross-talk coefficients.

The operation performed by the integrating filters is the following one:

$$Cjg_t = Cjg_{t-1} + k'ejg$$

i.e. at the instant t, the new estimated value of the cross-talk coefficient is equal to the value of the instant t−1 corrected by a fraction k' of the residual error $e_{jg}$.

This is an adaptive process according to the gradient algorithm.

FIG. 4b exemplifies an embodiment of these filters. A circuit 40 carries out a weighting, by means of a coefficient k' (lower than 1), of the residual cross-talk coefficient (ejg). The weighted coefficient is transmitted to an input of an addition circuit 41 whose output is looped to another input by a memory circuit 42. This memory circuit 42 is constituted, for example, like the one shown in FIG. 3d. It can be seen therefore that the residual cross-talk coefficient ejg, weighted by the coefficient k', is added to the value of the cross-talk coefficient computed previously for the same track.

FIGS. 4g and 4d then transmit cross-talk coefficients Cjg and Cjd to the cross-talk correction circuit 5 which is constituted in the same way as that of FIGS. 3a and 3e and which works in the same way.

The circuit of FIG. 4a therefore gives signals corrected for cross-talk x'j.

Like the circuit of FIG. 3a, the circuit of FIG. 4a possesses circuits 6 and 7 which give a track-following signal from cross-talk coefficients Cjg and Cjd.

It will be recalled that the processing of the track signals that have just been described can be done sequentially for the different tracks.

Figure 5:
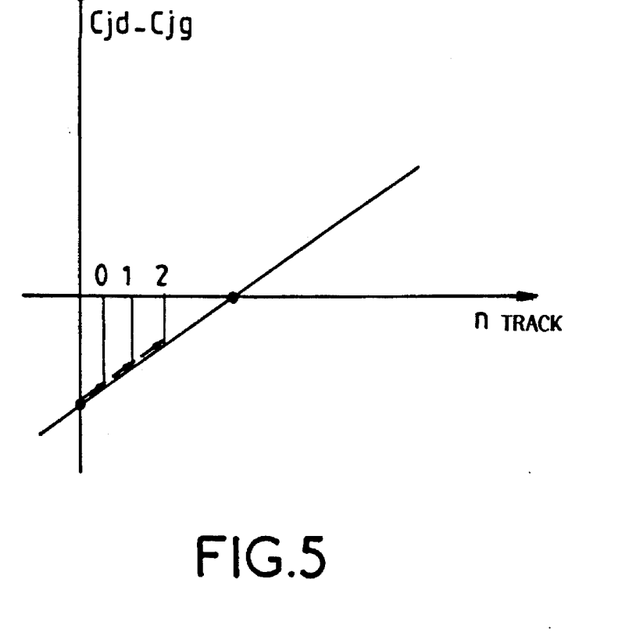
FIGS. 5 and 6 show means to correct the magnification of the optical reading system of the recording medium.

Furthermore, according to another aspect of the invention, if it is observed that the difference of the right-hand and left-hand cross-talk coefficients varies almost regularly for the different tracks throughout the width or at least on a part of the width of the recording medium, it must be considered that the magnification of the reading optical system is ill-adjusted According to the invention, there is therefore provision for computing the mean variation of the difference of the right-hand and left-hand cross-talk coefficients on n tracks. This amounts to computing the slope of the curve of variation of cross-talk as shown in FIG. 5.

The direction of the variation of the slope gives the sign of the magnification error.

The signal resulting from this processing operation is used to modify the magnification of the imaging objective TL4 (see FIG. 1).

This setting is done by means (not shown) by shifting either the optical system TL4 or the detectors TL6.

Figure 6:
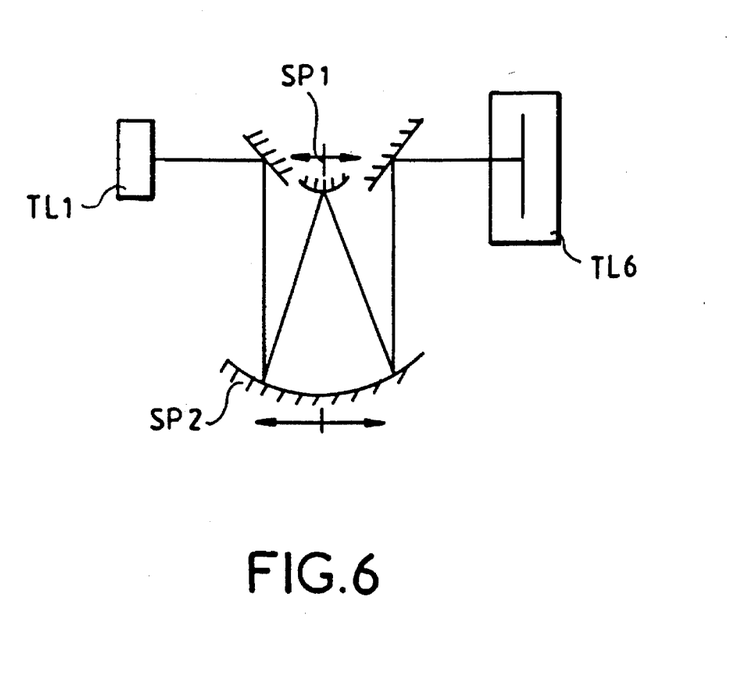

According to a compact version of the reading system shown in FIG. 6, the optical system of transmission between the Kerr effect device TL1 and the detectors TL6 includes spherical mirrors SP1 and SP2. To carry out the above adjustment, means (not shown) will shift either the mirror SP1 or the mirror SP2 along the arrows indicated.

What is claimed is:

1. A method of reading a recording medium having parallel information tracks and correcting signals on the information tracks, said method comprising the steps of:

(a) receiving signals from at least three consecutively parallel information tracks of said recording medium, said at least three consecutively parallel information tracks comprising a first information track and second and third information tracks which are directly adjacent to said first information track on either side thereof;

(b) determining a first cross-talk coefficient representing a degree of cross-talk between said first and second information tracks by multiplying the value of a signal on said first information track by +1 if the information signal on said second information track has a positive value, and by −1 if the information signal on said second track has a negative value;

(c) determining a second cross-talk coefficient representing a degree of cross-talk between said first and third information tracks by multiplying the value of a signal on said first information track by +1 if the information signal on said third information track has a positive value, and by −1 if the information signal on said third information track has a negative value;

(d) filtering said first and second cross-talk coefficients to obtain first and second filtered cross-talk coefficients;

(e) correcting said cross-talk between said first, second, and third information tracks in accordance with said first and second filtered cross-talk coefficients;

(f) forming a difference between said first and second filtered cross-talk coefficients and integrating this difference to generate a track following correction signal; and (g) repeating said steps (a) through (f) for each of the information tracks of said recording medium.

2. The method according to claim 1, wherein said difference is integrated in step (f) in a number of operations corresponding to the number of information tracks of said recording medium.

3. The method according to claim 1, wherein said step (e) consists of subtracting the product of said first filtered cross-talk coefficient and the value of the signal on said second information track from the value of the signal on said first information track, and subtracting the product of said second filtered cross-talk coefficient and the value of the signal on said third information track from said value of said signal on said first information track.

4. The method according to claim 3, wherein said step (d) consists of weighting, for each information track of said recording medium, a cross-talk coefficient by a coefficient k and adding this weighted cross-talk coefficient to a cross-talk coefficient previously estimated for the information track in question and weighted by a coefficient 1−k.

5. The method according to claim 3, further comprising the step of:

(a-1) amplitude correcting the signals received from said three consecutively parallel information tracks so as to standardize the signal amplitudes thereof.

6. The method according to claim 3, further comprising the steps of:

(e-1) determining residual cross-talk coefficients in accordance with the corrected cross-talk coefficients generated in step (e); and (e-2) continually updating said first and second cross-talk coefficients by fractions of said residual cross-talk coefficients.

7. A device for reading a recording medium having parallel information tracks and correcting signals on the information tracks, said device comprising:

a cross-talk estimation circuit for receiving signals from at least three consecutively parallel information tracks of said recording medium, said at least three consecutively parallel information tracks comprising a first information track and second and third information tracks which are directly adjacent to said first information track on either side thereof, and for determining a first cross-talk coefficient representing a degree of cross-talk between said first and second information tracks by multiplying the value of a signal on said first information track by +1 if the information signal on said second information track has a positive value, and by −1 if the information signal on said second track has a negative value, and a second cross-talk coefficient representing a degree of cross-talk between said first and third information tracks by multiplying the value of a signal on said first information track by +1 if the information signal on said third information track has a positive value, and by −1 if the information signal on said third information track has a negative value; and a cross-talk correction circuit for receiving said first and second cross-talk coefficients and said signals from said first, second, and third information tracks and generating a corrected cross-talk signal by subtracting the product of said first cross-talk coefficient and the value of the signal on said second information track from the value of the signal on said first information track, and subtracting the product of said second cross-talk coefficient and the value of the signal on said third information track from said value of said signal on said first information track.

8. A device according to claim 7, further comprising a circuit which receives said signals from said first, second, and third information tracks, corrects amplitudes of said signals, and outputs said signals to said cross-talk estimation circuit and said cross-talk correction circuit.

9. A device according to claim 7, further comprising:
a subtractor for receiving said first and second cross-talk coefficients and generating a difference therebetween; and
an integrator for integrating said difference and outputting a track following correction signal.

10. A device according to claim 7, further comprising filtering circuits connected between said cross-talk estimation circuit and said cross-talk correction circuit, each of said filtering circuits comprising:
a first weighting circuit for receiving a cross-talk coefficient and weighting said cross-talk coefficient by a first weighting coefficient k; and
an adder for continuously adding a current output of said first weighting circuit to a sum of a previous output of said first weighting circuit and said previous output of said first weighting circuit subsequently weighted by a second weighting coefficient 1−k.

11. A device according to claim 8, wherein said corrected cross-talk signals output by said cross-talk correction circuit are input to said cross-talk estimation circuit.

12. A device according to claim 11, further comprising filtering circuits connected between said cross-talk estimation circuit and said cross-talk correction circuit, each of said filtering circuits comprising:
a first weighting circuit for receiving a cross-talk coefficient and weighting said cross-talk coefficient by a first weighting coefficient k; and
an adder for continuously adding a current output of said first weighting circuit to a sum of a previous output of said first weighting circuit and said previous output of said first weighting circuit subsequently delayed via a memory.

13. A device according to claim 7, further comprising:
an optical beam transmitter for transmitting an optical beam to said recording medium which retransmits said optical beam;
an optical detector which receives the optical beam retransmitted by said recording medium;
magnification means for modifying a magnification of said device; and
a circuit for computing a mean variation of a difference between said first and second cross-talk coefficients over a set of information tracks and controlling said magnification means in accordance with this difference.

* * * * *